(12) United States Patent
Minghetti

(10) Patent No.: US 7,815,428 B2
(45) Date of Patent: Oct. 19, 2010

(54) APPARATUSES AND PROCESSES FOR PACKAGING PRODUCTS

(75) Inventor: Bianca Elena Minghetti, Reggio Emilia (IT)

(73) Assignee: Sarong SpA, Reggiolo (RE) (IT)

( * ) Notice: Subject to any disclaimer, the term of this patent is extended or adjusted under 35 U.S.C. 154(b) by 0 days.

(21) Appl. No.: 12/382,319

(22) Filed: Mar. 13, 2009

(65) Prior Publication Data

US 2009/0191296 A1 Jul. 30, 2009

Related U.S. Application Data

(62) Division of application No. 11/642,971, filed on Dec. 21, 2006, now Pat. No. 7,682,144.

(51) Int. Cl.
*B28B 17/00* (2006.01)
*B28B 1/48* (2006.01)

(52) U.S. Cl. .................. 425/184; 425/292; 425/398; 425/412; 264/153; 264/160

(58) Field of Classification Search .................. 425/184, 425/292, 296, 310, 290, 291, 521, 398, 412; 264/153, 160

See application file for complete search history.

(56) References Cited

U.S. PATENT DOCUMENTS

| 3,577,700 | A | 5/1971 | Bippus et al. |
| 3,888,066 | A | 6/1975 | Tabur |
| 4,104,349 | A | 8/1978 | Hillgenberg |
| 4,328,067 | A | 5/1982 | Cesano |
| 4,349,999 | A | 9/1982 | Mahaffy et al. |
| 4,404,162 | A | 9/1983 | Miki et al. |
| 4,755,129 | A * | 7/1988 | Baker et al. .................. 425/292 |
| 5,182,065 | A * | 1/1993 | Piotrowski et al. .......... 264/153 |
| 6,162,042 | A | 12/2000 | Reinhardt |
| 7,361,008 | B2 | 4/2008 | Crepaz |
| 2004/0232601 | A1 | 11/2004 | Kundinger et al. |
| 2007/0164489 | A1 | 7/2007 | Minghetti |

FOREIGN PATENT DOCUMENTS

IT MO2004A000158 12/2005

* cited by examiner

*Primary Examiner*—Maria Veronica D Ewald
(74) *Attorney, Agent, or Firm*—Nixon & Vanderhye P.C.

(57) ABSTRACT

An apparatus comprises an operating device and a die suitable for interacting to form containers from a sheet material, a cutting device for separating said containers from said sheet material, said cutting means being so shaped as to be removably connectable to said operating device.

36 Claims, 9 Drawing Sheets

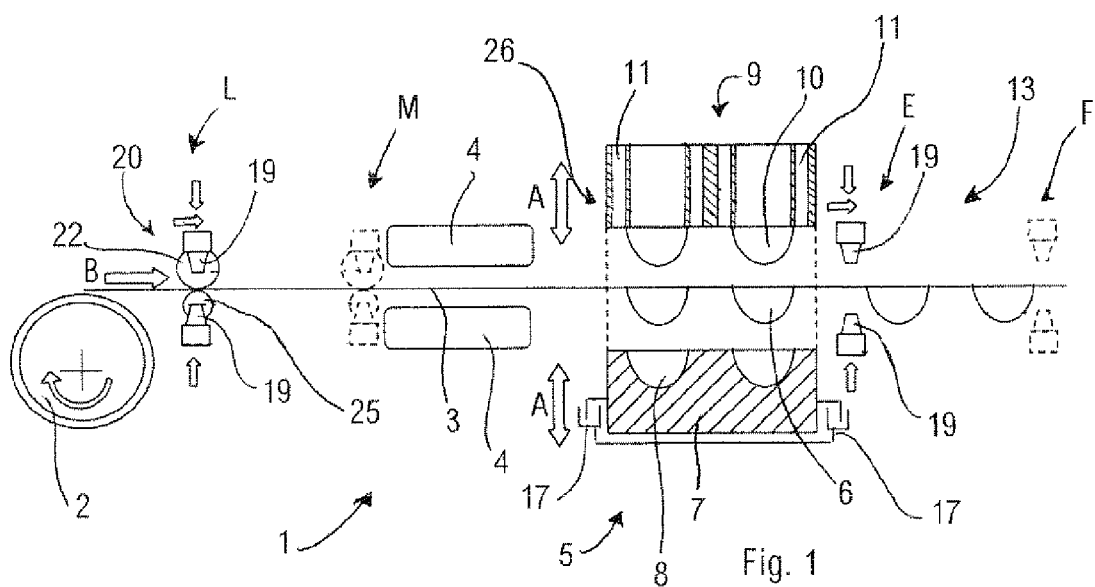
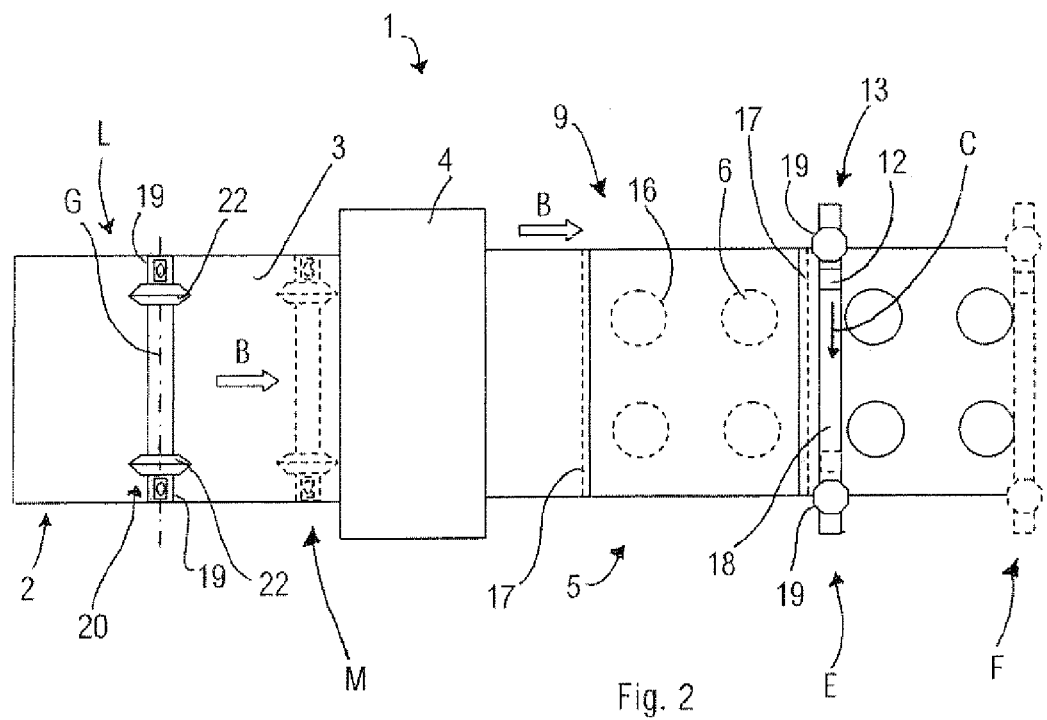

APPARATUSES AND PROCESSES FOR PACKAGING PRODUCTS

CROSS REFERENCE TO RELATED APPLICATION

This is a divisional of U.S. application Ser. No. 11/642,971, filed Dec. 21, 2006, now pending, incorporated herein by reference in its entirety.

The invention relates to apparatuses and processes for packaging products and/or objects of various types.

In prior art apparatuses are known for packaging products, comprising a heating station, in which a sheet of thermoformable material is heated and brought to a temperature at which it softens, a thermoforming station where the sheet is thermoformed by a punch interacting with a die and a filling station or loading station which fills the just-formed containers with a product. Downstream of the filling station is provided a welding station, where a film of heat-weldable material is associated to the containers in order to seal the product just poured internally thereof. Finally a shearing station is provided, which shears the containers singly or in groups, separating them from what remains of the thermoformable sheet and the portion of film which is not associated to the containers.

During operation, the sheet of heat-weldable material is unwound from a reel arranged upstream of the apparatus and is advanced by steps, horizontally along an advance direction, by a moving arrangement which acts in a synchronized way with all the stations. First the sheet is displaced by a step along the advance direction into the heating station where a quantity of heat is imparted onto a first portion of sheet; this brings the sheet to the softening temperature. Then the sheet is advanced by a further step towards the heat-forming station in such a way that the first portion of sheet is interposed between the die and the punch. At this point the die and the punch interact along a vertical closing direction, forcing the sheet to adhere to surfaces of cavities obtained in the die in order to form containers. The die is cooled for example by hydraulic circuits in order to remove heat from the containers, thus contributing to stabilising the shape thereof. Once the form of the containers has been stabilised, the punch and the die are reciprocally disengaged and distance vertically from the sheet, freeing the just-formed containers, which are solidly connected to what remains of the first portion of sheet. The moving arrangement advances the containers towards the filling station where they can receive a product, or objects, internally thereof. At this point the full containers, advancing by a further step, are brought into the welding station. The film of heat-weldable material, unwound from a further reel by the moving arrangement, is advanced in a synchronized way with the sheet to which the just-filled containers are connected. When the first portion of sheet provided with the full containers is in a welding position, heat-welding means, heated for example by electrical resistances, are activated vertically, sealing the film along open edges of the containers, while at the same time a second portion of sheet provided with other containers is in the filling station and a third portion of sheet is processed in the thermoforming station in order to produce further containers.

The heat-welding device then moves away from the full just-sealed containers that are taken on to the shearing station to be separated singly or in groups.

A drawback of the above known apparatus is that they are very large and therefore require large spaces for their installation.

A further drawback of these known apparatus is that, due to their high economic cost, they must be used to produce large quantities of packages, meaning they are only viable for use in industrial contexts.

A further drawback of these known apparatus is that they are not very versatile and do not allow a variation in a sequence of operations required for packaging products. Further, these known apparatus need very expensive change-format equipment, which require long set-up times.

A still further drawback is that the known apparatus require high and frequent maintenance costs. As they are apparatus, which are able to process large quantities of products at a time, they need frequent and expensive maintenance checks in order to avoid undesired malfunctioning, which might damage the products to be packed.

An object of the invention is to improve the apparatus for packaging products.

A further object of the invention is to provide an apparatus for packaging products which has very limited overall dimensions and therefore does not require large spaces for installation thereof.

A further object of the invention is to provide an apparatus for packaging products, which is quite simple and economical, and suitable for packaging any desired quantity of a product, i.e. an apparatus that is especially suitable for craft-type products.

A still further object of the invention is to provide an apparatus for packaging products which is very versatile and which enables a freer choice of a sequence of operations necessary for packaging products in order to satisfy needs connected to the production of special packages of products, or objects.

A still further object of the invention is to provide an apparatus for packaging products which, due to its very simple structural configuration, requires no frequent and expensive maintenance interventions.

In a first aspect of the invention, an apparatus is provided comprising an operating device and a die suitable for interacting to form containers from a sheet material, a shearing device for separating said containers from said sheet material, wherein said shearing device is so shaped as to be removably connectable to said operating device.

In a second aspect of the invention, an apparatus is provided which comprises an operating device and a die drivable by a driving device to form containers from a sheet material, a shearing device for separating said containers from said sheet material, wherein said shearing device is inserted in said operating device and is coupled to said driving device.

In a third aspect of the invention, an apparatus is provided comprising a die and an operating device comprising a bell associated with a punch, suitable for interacting to form containers from a sheet material, wherein on an edge zone of said bell a welding device is provided suitable for sealing said containers.

Owing to these aspects of the invention it is possible to obtain an apparatus which is compact and economical, able to perform various operations in a single operating station, in particular the operations of forming, shearing and sealing, and requiring smaller installation space.

In a fourth aspect of the invention, an apparatus is provided comprising a die and operating device comprising a punch, suitable for interacting along a closing direction to form containers from a sheet material wherein the die is extractable transversally to the closing direction.

In a fifth aspect of the invention, an apparatus is provided, comprising a die and an operating device provided with a punch, suitable for interacting along a closing direction to form containers from a sheet material, wherein the punch is transversally movable to the closing direction.

In a sixth aspect of the invention, an apparatus is provided comprising a die and an operating device provided with a punch, suitable for interacting along a closing direction to form containers from a sheet material, wherein the operating device is rotatably movable about an axis which is transversal to the closing direction.

Owing to these aspects of the invention it is possible to obtain a very versatile apparatus, which enables easy access to the die. This allows the formed containers to be arranged on the die, which containers for example first are to be filled with a product and thereafter sealed and sheared. Subsequently the containers can be extracted at the end of the packaging operations, using very small spaces for the movement of the die.

In a seventh aspect of the invention, an apparatus is provided which comprises an operating device and a die suitable for interacting to form containers from a sheet material, a moving arrangement for moving the sheet material, and an interacting arrangement suitable for interacting with the sheet material, wherein the interacting arrangement is mounted on the moving arrangement through a coupling arrangement.

By way of example, the interacting arrangement can comprise a scoring device for scoring the sheet material, or a perforating device for perforating the sheet material, or a cutting device for cutting the sheet material.

Owing to the invention an apparatus can be obtained for packaging products which is structurally simple and economical, and the dimensions of which are very limited. Thus the just-formed containers can be filled, sealed and sheared in a single operating station, enabling installation space to be better exploited.

The apparatus of the invention needs limited maintenance costs and is therefore suitable for craft-type production levels. The apparatus is also suitable for packaging small numbers of a product, obviating the drawback of having to have high productivity quotas in order to justify the costs of the plant.

In an eighth aspect of the invention, a process is provided comprising advancing a sheet material towards an operative position, forming containers from the sheet material in the operative position, filling the containers with a product, wherein the filling is provided in the operative position.

In a ninth aspect of the invention, a process is provided comprising advancing a sheet material towards an operative position, forming containers from the sheet material in the operative position, filling the containers with a product and sealing the containers, wherein the sealing is provided in the operative position.

In a tenth aspect of the invention, a process is provided which comprises advancing a sheet material towards an operative position, forming containers from the sheet material in the operative position, filling the containers with a product and sealing and shearing the containers, wherein the shearing is provided in the operative position. Owing to these aspects of the invention, a sequence of operations necessary for packaging the products can be varied. This means products of various types can be packaged, for which a different sequence of packaging operations may be eventually necessary. Thus it is possible, for example, to shear a sheet material for obtaining single containers or groups of containers even at the same time as the forming, and before the filling of the containers with a product. Further, the containers can be sheared and sealed at the same time.

In an eleventh aspect of the invention, a process is provided comprising-advancing a sheet material along an advance direction by a moving arrangement, moving the moving arrangement in a return direction opposite to the advance direction after having released the sheet material, wherein during the moving there is provided interacting on the sheet material.

By way of example, the above interaction can be scoring the sheet material, or perforating it, or cutting it.

The invention will be better understood and carried out with reference to the accompanying drawings, that illustrate some embodiments thereof by way of non-limitative examples, in which:

FIG. 1 is a schematic partially sectioned side view of an apparatus for packaging products in an operating configuration;

FIG. 2 is schematic view in elevation of the apparatus of FIG. 1;

Figure 3:
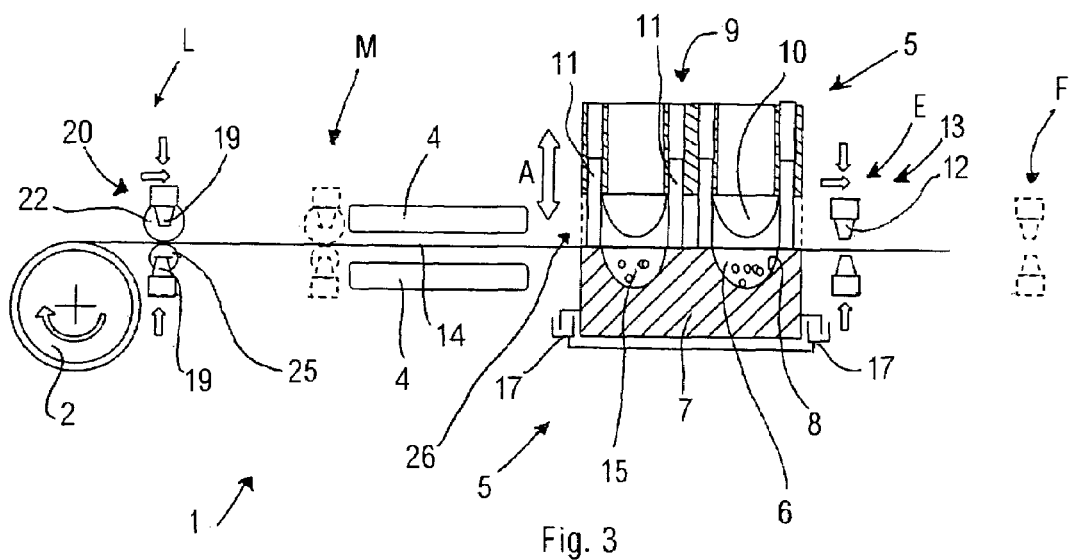
FIG. 3 is a schematic partially sectioned view showing the apparatus of FIG. 1 in a further operating configuration.
Figure 4:
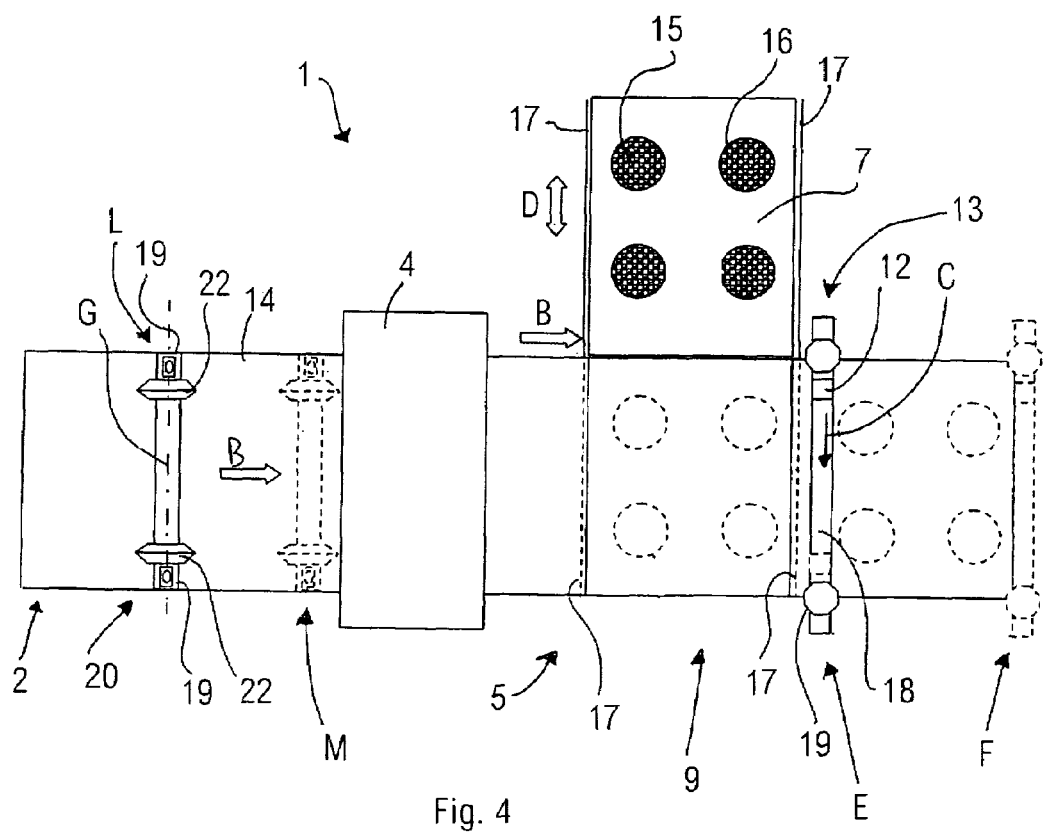
FIG. 4 is a schematic view in elevation of the apparatus of FIG. 3.
Figure 5:
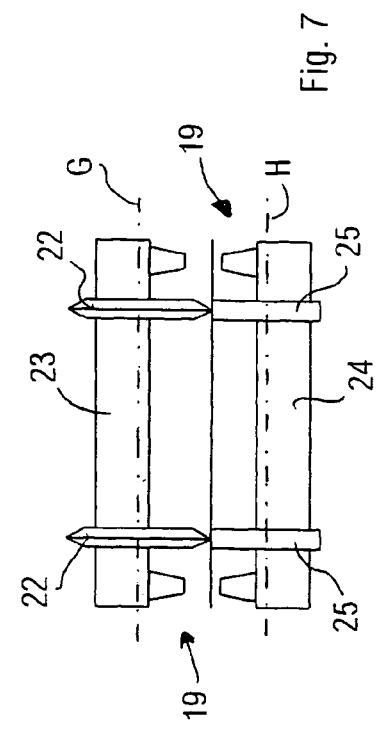
FIG. 5 is a front view illustrating an advancing and scoring device in an operating configuration.
Figure 6:
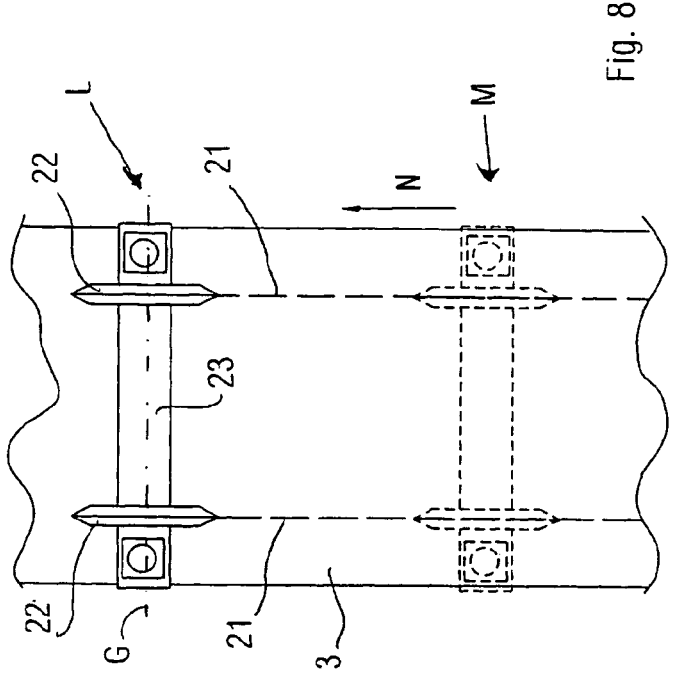
FIG. 6 is an elevation of the advancing and scoring device for of FIG. 5.
Figure 7:
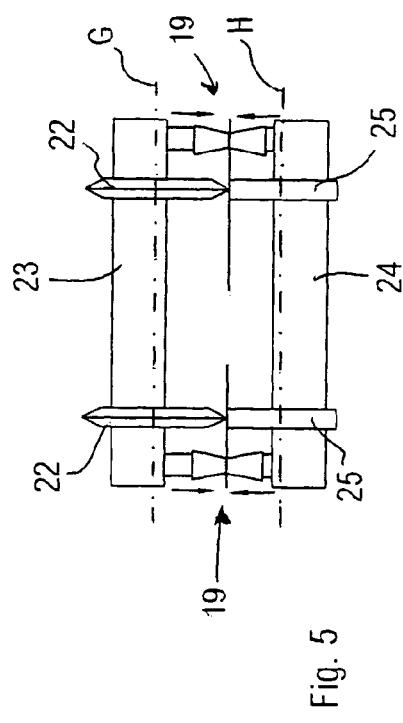
FIG. 7 is a front view of the advancing and scoring device of FIG. 5 in a further operating configuration.
Figure 8:
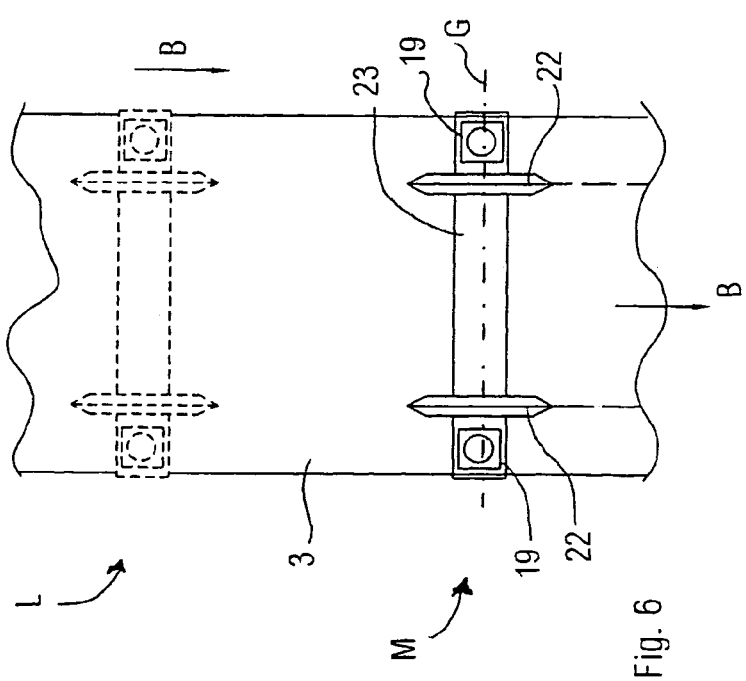
FIG. 8 is an elevation of the advancing and scoring device of FIG. 7.

With reference to FIGS. 1 to 8 there is illustrated an apparatus 1 for packaging products, comprising, upstream, a supporting device 2 for rotatably supporting a reel of thermoformable sheet material 3, a heating station 4 for heating the sheet material 3 and an operating station 5 where various functions are performed, as will be better described herein below.

The operating station 5 comprises a die 7, provided with cavities 8, able to interact along a closing direction A with an operating device 9. The operating device 9 comprises a punch 10 associated to a bell 26 on which a welding device 11 can be arranged, which will be described in greater detail herein below.

An advancing device 13 is arranged downstream of the operating station 13, which advancing device 13 comprises piston pliers 19 which are movable in a direction perpendicular to the surface of the sheet material 3. In this way the sheet material 3 can be gripped and drawn in order to advance it stepwise in an advance direction B. A mobile support structure 18 is associated to the advancing device 13, on which support structure 18 a transversally cutting device 12 is supported, which cut the sheet material 3 moving along a cutting direction C transversal to the advance direction B.

Upstream of the heating station 4 there is located an advancing and scoring device 20, also provided with piston pliers 19 alike to the advancing device 13. The advancing and scoring device 20 cooperates in a synchronized way with the advancing device 13, in order to facilitate the stepwise advancement of the sheet material 3.

The advancing and scoring device 20 comprises an upper support bar 23, to which disc cutters 22 are rotatably connected for scoring the sheet material 3 in a way which will be described in more detail herein below. The disc cutters 22 are so shaped as to be able to rotate about a rotation axis G that is perpendicular to the advance direction B and parallel to the surface of the sheet material 3.

The advancing and scoring device 20 comprises a lower support bar 24, arranged in such a way that the sheet-material 3 is interposed between the lower support bar 24 and the upper support bar 23, and to which reaction wheels 25 are rotatably connected. The reaction wheels 25 are rotatable about a further rotation axis H that is parallel to the rotation axis G, and are so shaped as to interact with the disc cutters 22.

In a first operating configuration, the sheet material 3 is unwound from the reel and advanced stepwise by the advancing device 13 and the advancement and scoring device 20, which are movable parallel to the advance direction B. In particular the sheet material 3 is gripped by the piston pliers 19 and advanced by steps along the advance direction B.

The advancing device 13 moves cyclically from a first position E, close to the operating station 5, in which they grip the sheet material 3, to a second position F which is distanced by a quantity equal to an advancement step, in which the advancing device 13 releases the sheet material 3 and are ready to return into the first position E.

The advancing and scoring device 20 moves in a synchronized way with the advancing device 13 from a further first position L, more distant from the heating station 4, to a further second position M which is closer to the heating station 4. In the further first position L, the piston pliers 19 are arranged in such a way as to grip the sheet material 3 (as better illustrated in FIGS. 5 and 6), after which they advance by one step along the advance direction B drawing the sheet material 3. During motion from the further first position L to the further second position M, the disc cutters 22 and the reaction wheels 25 do not rotate and are drawn with the sheet material 3. In this way the disc cutters 22 make no cut on the sheet material 3. Thereafter, the piston pliers 19 release the sheet material 3 (as is better illustrated in FIGS. 7 and 8) in order that the advancing and scoring device 20 can return to the further first position L while the sheet material 3 is momentarily still. While the advancing and scoring device 20 moves along a return direction N, towards the supporting device 2, the disc cutters 22 and the reaction wheels 25 remain in contact with the sheet material 3 which is stationary, rolling on it. The disc cutters 22, as they rotate, press the sheet material 3 against the reaction wheels 25, scoring the sheet material 3 and leaving scorelines 21 which will serve for facilitating the separation of a container from another container.

The sheet material 3 passes first through the heating station 4, in which a quantity of heat necessary for reaching the softening temperature is imparted on a first portion of sheet material 3. Thereafter the first portion of sheet material 3 is made to advance so that it is arranged internally of the operating station 5 between the die 7 and the operating device 9. The die 7 and the operating device 9 are first arranged in a distanced configuration in order to allow the sheet material 3 to advance between them. When the sheet material 3 is stationary, after having advanced by a step, the die 7 and the operating device 9 are driven to near one another along the closing direction A, by a driving device 33 which uses cams and/or hydraulic pistons (not illustrated). At this point, the operating bell 26 (better illustrated in FIGS. 9 to 14), associated to the operating device 9, is driven by the driving device 33 and is neared to the die 7 in order to keep a portion of sheet material 3 still. In this way it is possible thereafter to drive the punch 10, causing it to interact with the cavity 8 to form containers 6, avoiding the risk that further portions of sheet material 3 will be drawn internally of the die 7.

A cooling device is associated with the die 7, which cooling device might comprise, for example, hydraulic circuits which extract heat from the containers 6 in order to stabilise the shape thereof quickly. The just-formed containers 6 are connected to the sheet material 3 and as soon as the punch 10 and the die 7 disengage, reciprocally distancing, the container 6 and sheet material 3 are advanced by a further step by the advancing device 13. Thereafter, the advancing device 13 is brought near the operating station 5 and the transversally cutting device 12 cuts the portion of sheet containing the just-formed containers 6 by moving along the cutting direction C (shown in FIGS. 2 and 4). At the same time, a further portion of sheet material 3 is processed internally of the operating station 5 so that further containers 6 can be thermoformed. At this point the containers 6 are ready to be filled and sealed.

In a second operating configuration of the apparatus 1, a further sheet material 14, which is heat-weldable, is arranged on the supporting device 2, said further sheet material 14 being used to close the previously-thermoformed containers 6 once they have been filled with a product 15 or with objects which can be of various types. Alternatively to the further sheet material 14, closing elements can be used, such as lids, which are applied to the containers 6 in order to conserve the product 15 contained therein.

The die 7, apart from being vertically movable along the closing direction A, can also be horizontally movable slidingly along telescopic guides 17. The telescopic guides 17 are arranged parallel to a loading-unloading direction D which is transversal to the advance direction B, and are so shaped as to project and extend externally of the operating station 5. In this way the die 7 can be supported in such a way as to project to the outside of the operating station 5. When the die 7 is repositioned below the operating device 9, the telescopic guides 17 completely retract towards the operating station 5, so as to reduce the dimensions thereof.

Once the die 7 has been projected to the outside of the operating station 5, the cavities 8 are completely accessible. The cavities 8, used previously to thermoform the containers 6, are now used for receiving and supporting the containers 6 while the product 15 is inserted therein. Once the containers 6, supported by the die 7, have been filled with the product 15, the die 7 can be repositioned below the operating device 9.

Figure 9:
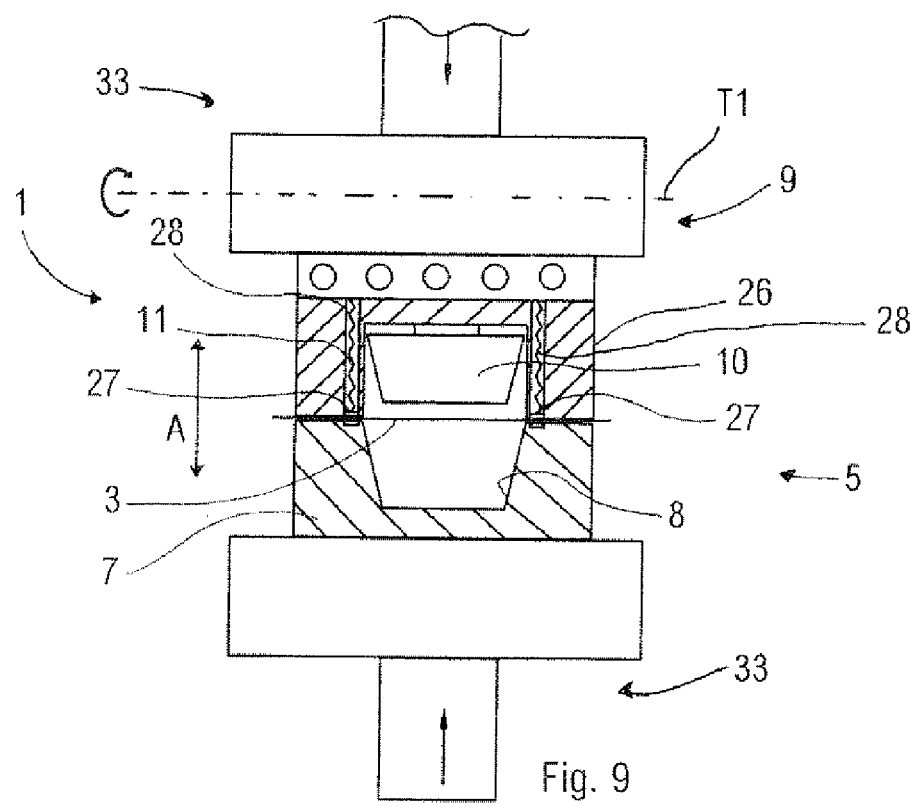
FIG. 9 is a side and partially sectioned view of a part of the apparatus for packaging products of the invention.
Figure 10:
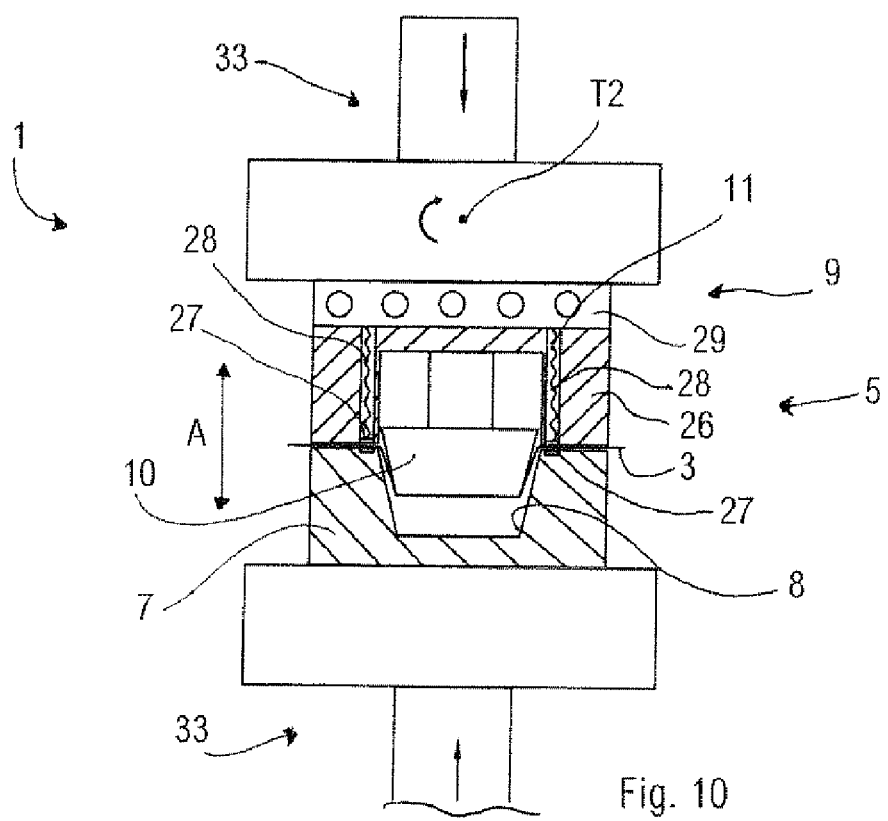
FIG. 10 is a further side and partially sectioned view of the apparatus of FIG. 9.

The operating device 9 can be supported in such a way as to be rotatable about a horizontal opening axis T1, parallel to the advance direction B (as shown in FIG. 9), or about a horizontal opening axis T2, perpendicular to the advancement direction B (as shown in FIG. 10). In this way the operating device 9 can be rotated, distancing them from the die 7. This enables the containers 6 to be filled and/or sealed to be loaded onto the die 7.

When the containers 6, filled with the product 15, are ready to be sealed, the operating device 9 and the die 7 are neared to one another by the driving device 33, in such a way that the bell 26, while lowering, presses on the further sheet material 14, or on the lids, while the punch 10 is kept away from the containers 6 so as not to interfere with the sealing operations, as shown in FIG. 9.

At this point the welding device 11 can weld the further sheet material 14, or the lids, to the containers 6 filled with product 15. The welding device 11 (best illustrated in FIGS. 9 to 14) comprises heat-welding elements 27, inferiorly connected to the bell 26 and arranged in such a way as to release heat by contact on the further sheet material 14, or the lids. The heat-welding elements 27 can be surrounded by heat-insulated portions of the bell 26 so that the heat is directed near edges of openings 16 of the containers 6. The heat-welding elements 27 are connected, via heat-conducting elements 28, for example copper bars, to a heat source 29 which generates heat by means, for example of electrical resistances. The heat source 29 is activated only when it is necessary to heat the welding device 11 in order to seal the containers 6. When the operating device 9 are used to thermoform the containers 6, the heat source 29 is deactivated in order not to prevent the just-formed containers 6 from cooling and solidifying. Alternatively to a heat-welding process as the one described above, the containers 6 might be sealed using a process exploiting high-frequency ultrasound waves.

If the further sheet material 14 is used, once the containers 6 have been sealed singly or in groups, the operating device 9 and the die 7 can be distanced so that the containers 6 are supported only to the further sheet material 14. At this point the advancing device 13 and the advancing and scoring device 20, advance the further sheet material 14 by a step along the advance direction B, together with the containers 6. Then the transversally cutting device 12 moves along the transversal cutting direction C and separates the sealed containers 6 from the remaining part of the further sheet material 14, while at the same time further groups of containers 6 can be sealed. If the operating station 5 is used for closing containers 6 with lids, after sealing the operating device 9 and the die 7 can be distanced so that the containers 6 can be removed. If groups of containers connected to one another are sealed, and singly-packaged containers 6 are required, after sealing the groups of container 6 must be sheared. A shearing device can be provided which comprises an upper cutting die 30 and a lower cutting die 31 having cutting edges 32 which, reciprocally interacting, provide a cut along edges of the containers 6. The upper cutting die 30 and the lower cutting die 31 can be provided with cutting edges 32 which enable a single container 6, or a group of containers 6 to be cut off at a time (as shown in Figures from 15 to 17), or the cutting dies 30 and 31 can have cutting edges 32 which enable a plurality of single-packaged containers 6 to be cut off together (as shown in Figures from 18 to 20).

Figure 11:
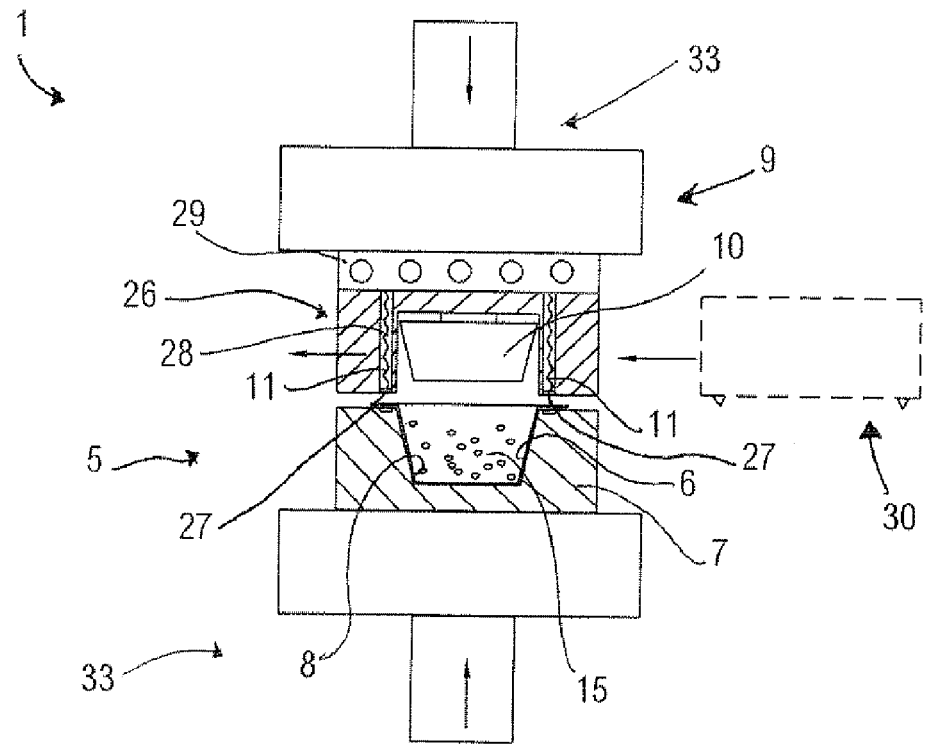
FIG. 11 is a side and partial view of the apparatus of FIG. 9 in a further operating configuration.
Figure 12:
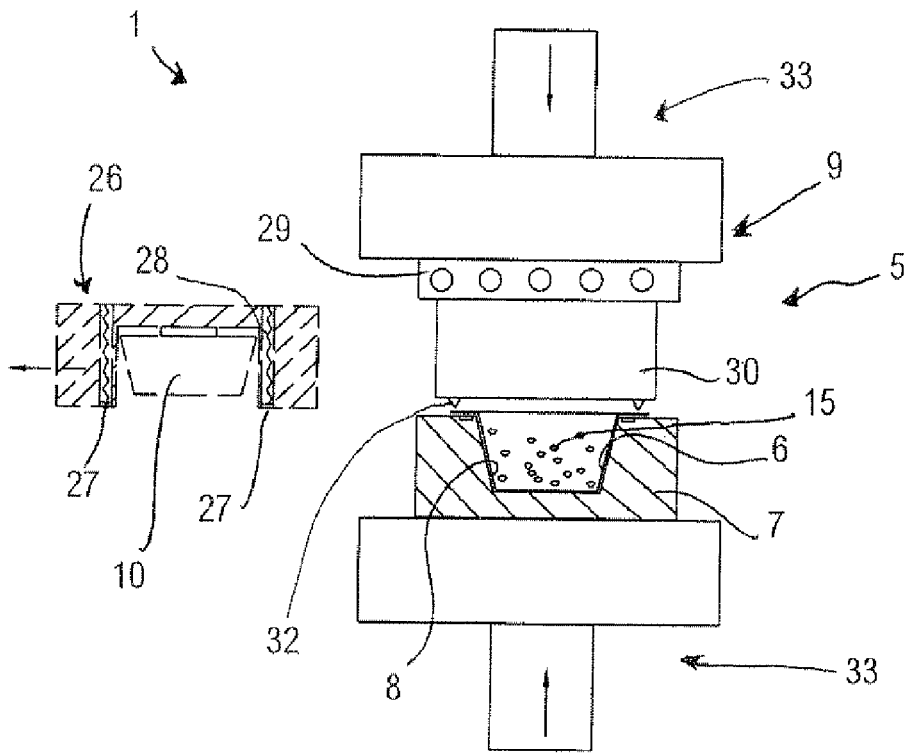
FIG. 12 is a side and partial view of the apparatus of FIG. 11 in a further operating configuration.
Figure 13:
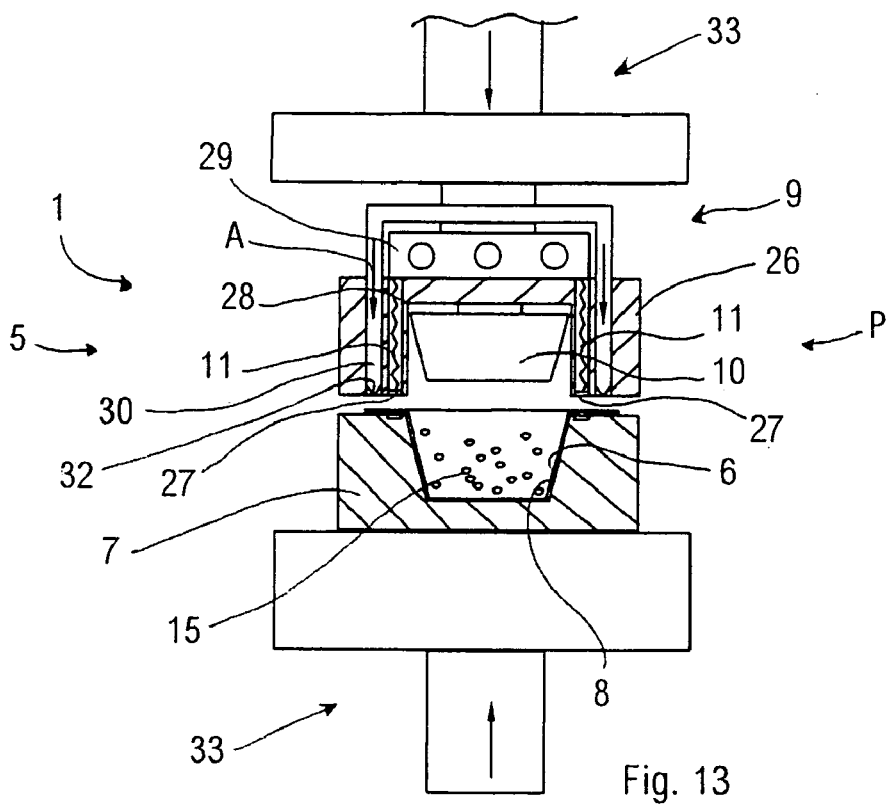
FIG. 13 is side and partial view of a further embodiment of an apparatus for packing products in an operating configuration.
Figure 14:
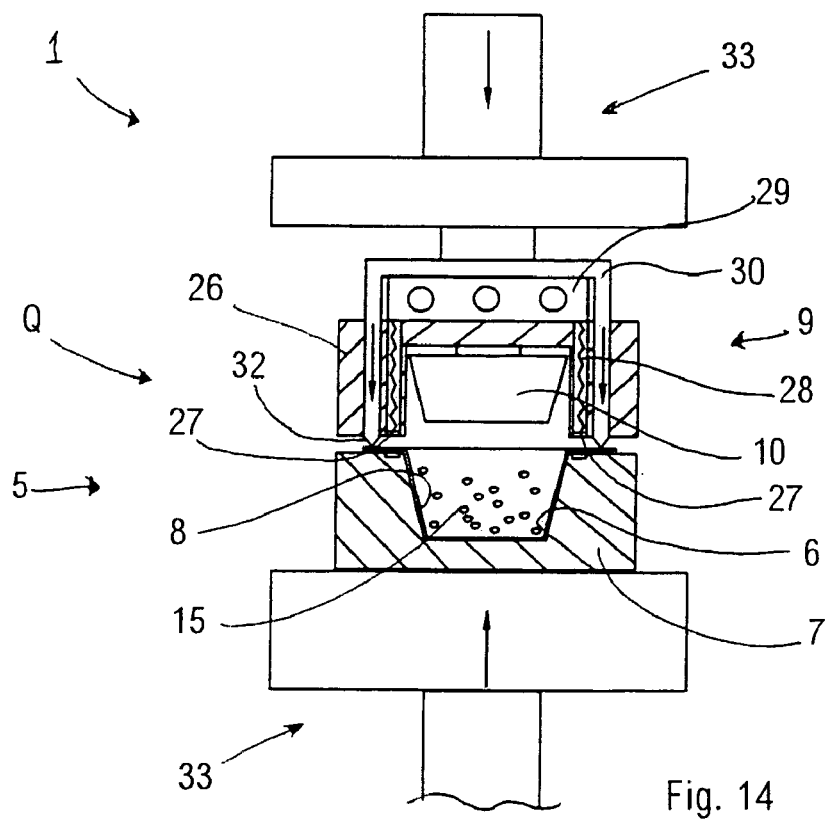
FIG. 14 is a side and partial view of the apparatus of FIG. 13 in a further operating configuration.
Figure 15:
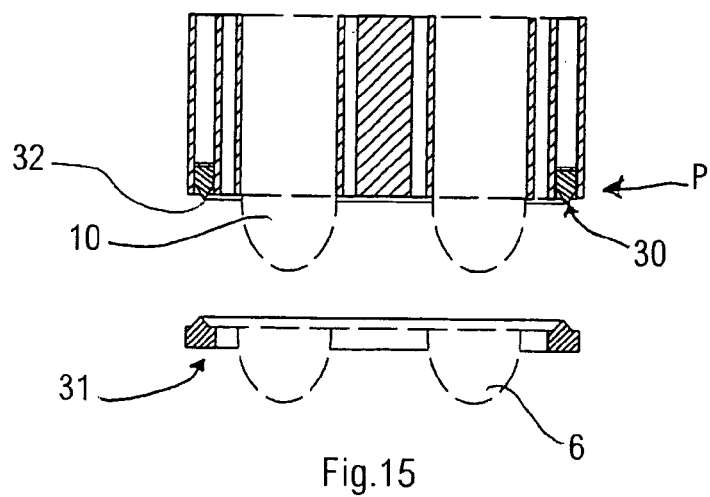
FIGS. 15 and 16 are schematic views of a shearing device of an apparatus for packaging products in two operating configurations.
Figure 16:
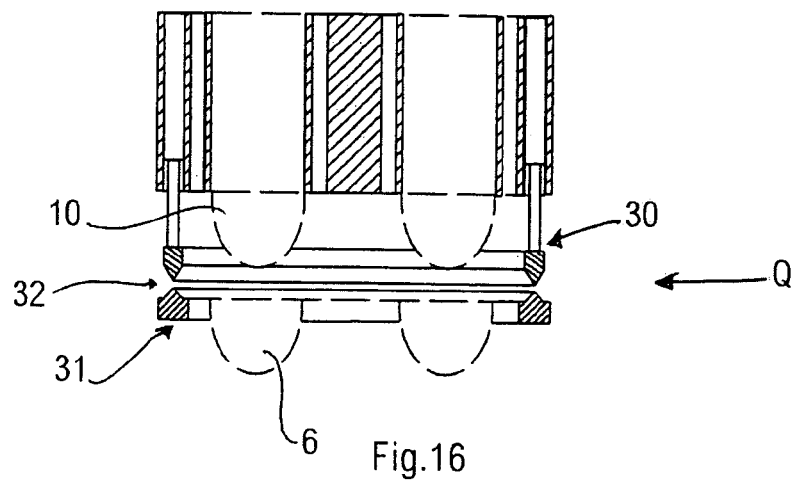
Figure 17:
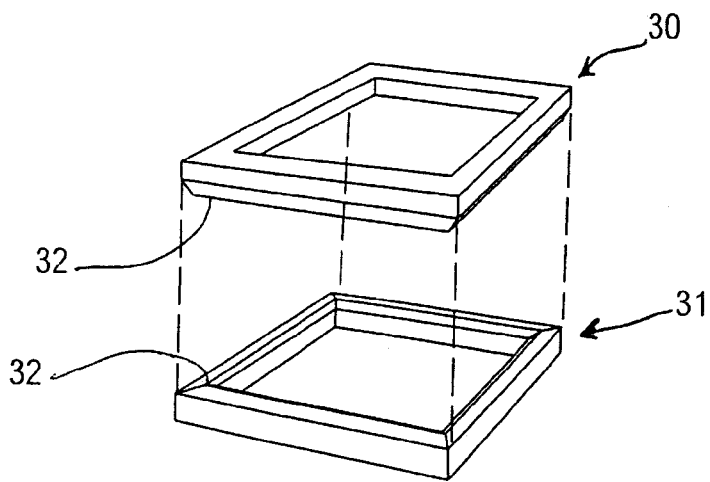
FIG. 17 is a perspective view of the shearing device of FIGS. 15 and 16.
Figure 18:
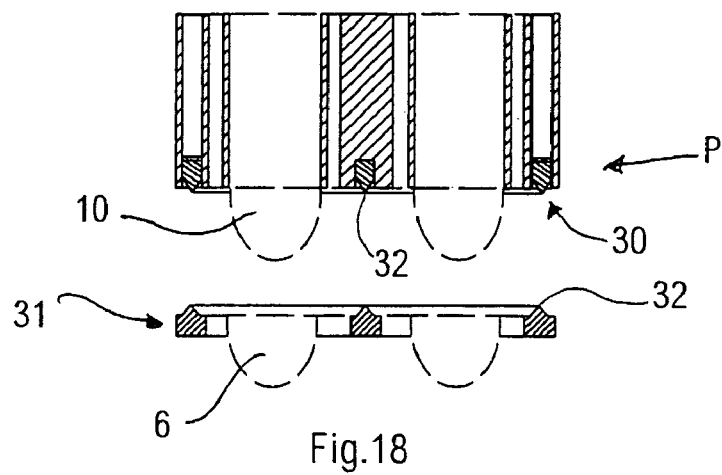
FIGS. 18 and 19 are views like those of FIGS. 15 and 16 illustrating a shearing device made according to a further embodiment and in two operating configurations.
Figure 19:
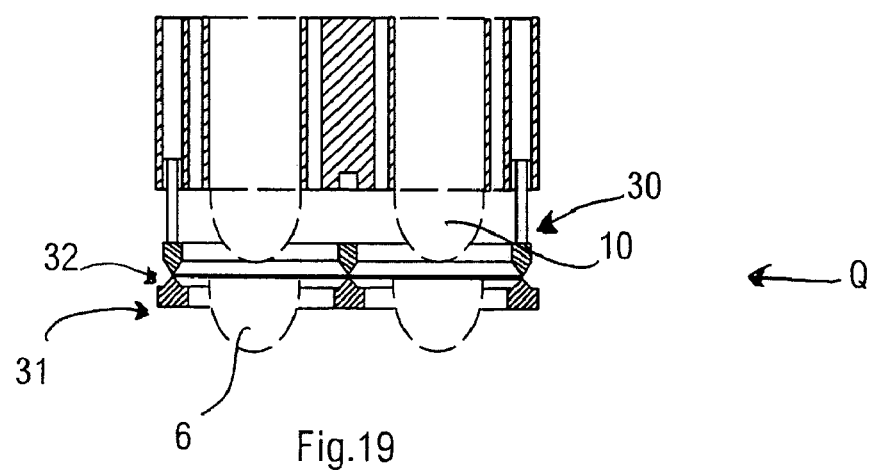
Figure 20:
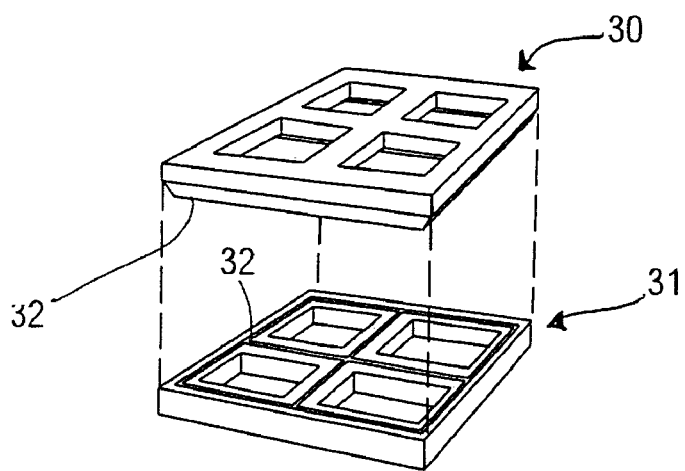
FIG. 20 is a perspective view of the shearing device of FIGS. 18 and 19.

In an embodiment of the apparatus 1, shown in FIGS. 11 and 12, the operating bell 26 and the punch 10 are so shaped as to be removable from the operating station 5 in order to free up a space which can be used for inserting the upper cutting die 30. The lower cutting die 31 is connected to an upper portion of the die 7 and acts as an abutment for the upper cutting die 30. The driving device 33, apart from moving the punch 10, the operating bell 26 and the die 7 during the forming and the sealing of the containers 6, can also move the upper cutting die 30 and the lower cutting die 31. In this way it is possible to shear groups of containers 6, obtaining singly packaged products which can then be removed from the die 7, extracting them in the loading-unloading direction D as described herein above.

With reference to Figures from 13 to 20, a further embodiment of the apparatus 1 is shown, in which the upper cutting die 30 is constantly connected to the operating device 9. In particular, the upper cutting die 30 is vertically slidable internally of the operating bell 26 and can be driven along the closing direction A by the driving device 33. The upper cutting die 30 can be arranged in a retracted position P, in which the cutting edges 32 are distanced from the die 7 so that they do not interfere there-with during the forming and sealing of the containers 6. The upper cutting die 30 can also be positioned in an operative position Q, in which it is partially projected downwards, in order to project externally of the operating bell 26 in order to shear the containers 6.

Figure 21:
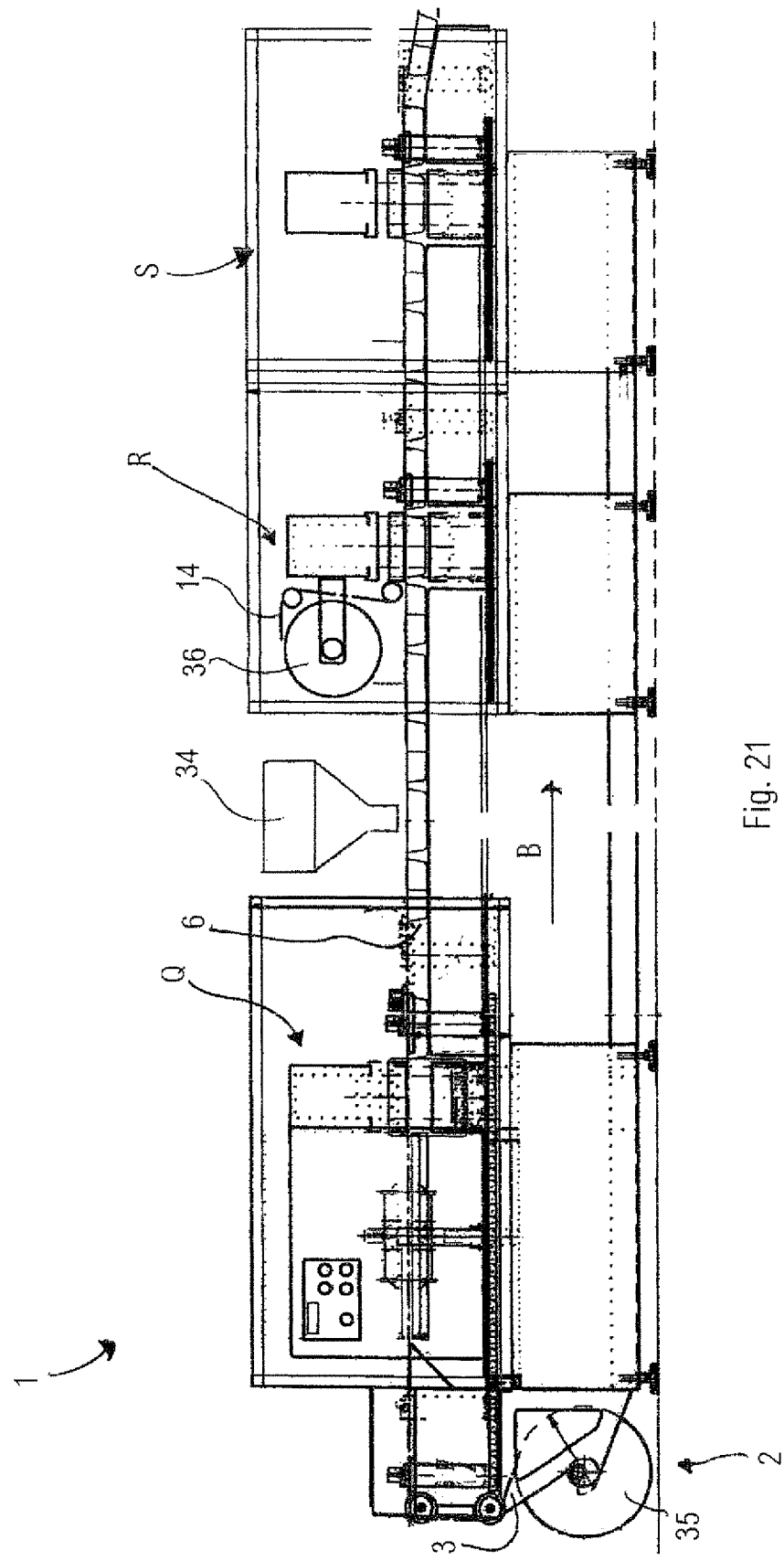
FIG. 21 is a schematic side view of an apparatus for packaging products which is completely automatic.

With reference to FIG. 21, a further embodiment of the apparatus 1 is shown which comprises a supporting device 2, and downstream thereof a forming module Q in which containers 6 are formed from the sheet material 3 that is unwound from a first reel 35. The forming module Q comprises a die 7 and an operating device 9 provided with a punch 10 and an operating bell 26 as described in reference to FIGS. 9 and 10. The containers 6, during the step-advancement along the advance direction B, can be filled with a product manually or automatically by including an infeeding element 34. Downstream of the forming module Q and also of the infeeding element 34 if present, there is a sealing module R which comprises a die 7 and an operating bell 26 on which welding device 11 is provided according to what is also described in relation to Figures from 9 to 14. In the sealing module R, a further sheet material 14, unwound from a second reel 36, is sealed by the welding device 11 onto the previously-filled containers 6.

A shearing module S is arranged downstream of the sealing module R; the shearing module S comprises an upper cutting die 30, and a die 7, provided with a lower cutting die 31. The containers 6, after having been filled and sealed, reach the shearing module S to be sheared. In this way they are separated from what remains of the sheet material 3 and the further sheet material 14, and are ready to be sorted.

In this way, the above-described apparatus 1 enables a packaging of products to be obtained completely automatically, in which the forming, the filling, the sealing and the shearing of the containers 6 is done in distinct modules. It is thus possible to obtain an apparatus which is especially suited to packaging products in industrial quantities, i.e. in a continuous cycle which reduces dead times to a minimum and provides high productivity.

The invention claimed is:

1. Apparatus, comprising an operating device and a die provided with a cavity, said operating device and said die being drivable by a driving device along a closing direction to form containers from a sheet material, said operating device comprising a punch interacting with said cavity at an operating station along said closing direction during forming of said containers, said apparatus further comprising a shearing device to separate said containers from said sheet material, wherein said shearing device is arranged to the outside of said operating station during said forming and said operating device is removable from said operating station after said forming to allow said shearing device to be inserted in place of said operating device, said shearing device being drivable by said driving device along said closing direction between a retracted position in which a cutting edge of said shearing device does not interfere with the die and a shearing position in which said shearing device is in abutment with said die during separation of the containers from said sheet material; and wherein said die is slidably supported along a guide arrangement between said operating station and a loading station in which said die arrangement is arranged to the outside of said operating station to allow said separated containers to be filled.

2. Method of forming containers from a sheet material, comprising driving by a driving device an operating device and a die provided with a cavity along a closing direction, forming of said containers by a punch of said operating device interacting with said cavity at an operating station along said closing direction, separating said formed containers from said sheet material by a shearing device, wherein said method further comprises arranging said shearing device to the outside of said operating station during said forming and removing said operating device from said operating station after said forming to allow said shearing device to be inserted in place of said operating device, driving said shearing device by said driving device along said closing direction between a retracted position in which a cutting edge of said shearing device does not interfere with the die and a shearing position in which said shearing device is in abutment with said die during separation of the containers from said sheet material; and further comprising slidably supporting said die along a guide arrangement between said operating station and a loading station in which said die arrangement is arranged to the outside of said operating station to allow said separated containers to be filled.

3. Method according to claim 2, and comprising sealing said containers, wherein said sealing is provided in said operating station.

4. Method according to claim 3, and comprising feeding closing elements in said operating station to seal said filled containers.

5. Method according to claim 3, and comprising feeding a further sheet material in said operating station to seal said filled containers.

6. Method according to claim 3, wherein said operating device comprises a bell arrangement surrounding said punch and wherein said sealing comprises providing a welding device on an edge zone of said bell arrangement, said welding device being suitable for sealing said containers.

7. Apparatus according to claim 1, wherein said shearing device comprises a cutting die inferiorly provided with said cutting edge.

8. Apparatus according to claim 1, wherein said die is provided with an abutment element, so shaped as to interact with said cutting edge.

9. Apparatus according to claim 1, and further comprising a moving arrangement for moving said sheet material along an advance direction.

10. Apparatus according to claim 9, wherein said moving arrangement comprises pliers for gripping said sheet material.

11. Apparatus according to claim 9, and further comprising an interacting arrangement mounted on said moving arrangement by means of a coupling arrangement.

12. Apparatus according to claim 11, wherein said coupling arrangement comprises a rotatable coupling element.

13. Apparatus according to claim 11, wherein said coupling arrangement comprises a slidable coupling element.

14. Apparatus according to claim 11, wherein said moving arrangement comprises a first moving device arranged upstream of said die and said operating device.

15. Apparatus according to claim 14, wherein said first moving device comprises a support bar arrangement.

16. Apparatus according to claim 15, wherein said interacting arrangement comprises a first interacting device mounted on said support bar arrangement.

17. Apparatus according to claim 16, wherein said support bar arrangement comprises a support bar extending parallel to an axis transverse to the advance direction, said support bar being suitable for being positioned on the one side of said sheet material.

18. Apparatus according to claim 17, wherein said support bar arrangement comprises a further support bar extending parallel to a further axis which is parallel to said axis, said further support bar being suitable for being positioned on an opposite side of said sheet material.

19. Apparatus according to claim 16, wherein said first interacting device is selected from a group comprising: a first scoring device for scoring said sheet material; a first perforating device for perforating said sheet material; a first cutting device for cutting said sheet material.

20. Apparatus according to claim 18, wherein said first interacting device comprises a disc cutter connected, by a rotatable coupling element of said coupling arrangement, to said support bar in order to be rotatable about said axis.

21. Apparatus according to claim 20, wherein said first interacting device comprises a reaction wheel connected, by a further rotatable coupling element of said coupling arrangement, to said further support bar in order to be rotatable about said axis, said reaction wheel being suitable for interacting with said disc cutter and said sheet material.

22. Apparatus according to claim 11, wherein said moving arrangement comprises a second moving device arranged downstream of said die and said operating device.

23. Apparatus according to claim 22, wherein said second moving device comprises a support structure having a longitudinal axis arranged transversally of said advance direction.

24. Apparatus according to claim 23, wherein said interacting arrangement comprises a second interacting device mounted on said support structure slidably along said longitudinal axis.

25. Apparatus according to claim 24, wherein said second interacting device is selected from a group comprising: a second scoring device for scoring said sheet material; a second perforating device for perforating said sheet material; a second transversally cutting device for transversally cutting said sheet material.

26. Apparatus according to claim 1, wherein said operating device is movable transversally of said closing direction.

27. Apparatus according to claim 26, wherein said operating device is mounted rotatably about an opening axis parallel to an advance direction along which said sheet material is movable in said apparatus.

28. Apparatus according to claim 26, wherein said operating device is mounted rotatably about an opening axis perpendicular to an advance direction along which said sheet material is movable in said apparatus.

29. Apparatus according to claim 1, wherein said operating device comprises a bell arrangement suitable for interacting with said die.

30. Apparatus according to claim 29, wherein in an edge zone of said bell arrangement a welding device is provided, for sealing said containers.

31. Apparatus according to claim 30, wherein said welding device is selected from a group comprising: a heat-welding device; an ultrasound waves emitting device.

32. Apparatus according to claim 30, wherein said welding device comprises heat-welding elements facing said die, said welding device being suitable for interacting with edges of openings of said containers.

33. Apparatus according to claim 32, wherein said heat-welding elements are surrounded by heat-insulating portions of said bell arrangement.

34. Apparatus according to claim 32, wherein said heat-welding elements are associated to a heat source in order to receive heat through heat-conducting elements from said heat source.

35. Apparatus according to claim 1, wherein said guide arrangement comprises telescopic guides arranged transversally to said closing direction.

36. Apparatus according to claim 35, wherein said telescopic guides are perpendicular to an advance direction along which said sheet material is movable.

* * * * *